(12) United States Patent
Pepin et al.

(10) Patent No.: US 7,855,807 B2
(45) Date of Patent: Dec. 21, 2010

(54) DIGITAL IMAGE PROCESSOR SPOT COLOR WORKFLOW TEST FILE

(75) Inventors: Louis Omer Joseph Pepin, Rochester, NY (US); David C. Brownhill, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 736 days.

(21) Appl. No.: 11/783,833

(22) Filed: Apr. 12, 2007

(65) Prior Publication Data

US 2008/0252913 A1    Oct. 16, 2008

(51) Int. Cl.
*B41J 1/00* (2006.01)
*G03F 3/08* (2006.01)
*H04N 1/46* (2006.01)
*G06K 9/00* (2006.01)
*G09G 5/02* (2006.01)

(52) U.S. Cl. .................. 358/1.9; 358/500; 358/504; 358/518; 358/3.26; 382/162; 382/163; 382/164; 382/165; 382/167; 345/592; 345/593; 345/594

(58) Field of Classification Search ............ 358/1.9, 358/518, 3.26, 1.15, 500, 504, 520; 382/162, 382/167, 163, 164, 266, 165; 347/254; 345/581, 345/593, 592, 594, 431, 435, 629; 715/209
See application file for complete search history.

(56) References Cited

U.S. PATENT DOCUMENTS

| | | | | |
|---|---|---|---|---|
| 6,289,364 B1 * | 9/2001 | Borg et al. | ................. | 715/209 |
| 6,393,145 B2 * | 5/2002 | Betrisey et al. | ............. | 382/162 |
| 6,504,625 B1 * | 1/2003 | Amero et al. | ................ | 358/1.9 |
| 7,408,673 B1 * | 8/2008 | Chinn et al. | ................. | 358/1.9 |
| 2005/0212907 A1 * | 9/2005 | Teraue | ........................ | 347/254 |
| 2006/0098233 A1 * | 5/2006 | Jodra et al. | ................ | 358/3.26 |
| 2007/0002342 A1 | 1/2007 | Morales et al. | | |
| 2008/0231637 A1 * | 9/2008 | Motter | ........................ | 345/581 |

* cited by examiner

*Primary Examiner*—Charlotte M Baker
(74) *Attorney, Agent, or Firm*—Oliff & Berridge, PLC

(57) ABSTRACT

An electronic portable document format (PDF) file contains different combinations of gradient blends between spot color and process color. Each gradient blend is represented as both rasterized bitmap and vector images. The rasterized bitmap and vector images can be used to quickly assess the capability of any digital front end (DFE) to process the color gradient blends. The PDF file contains two sets of spot color and process color blended combinations. The first set contains four types of color gradient blends: spot-to-spot, process-to-spot, spot-to-process, and process-to-process, each of which represent the intended design. The second set contains the same four types of color gradient blends, except here the CMYK colors associated with the spot colors are intentionally manipulated. By printing the PDF file using different DFEs, one may compare the output from the two sets and immediately identify any color gradient handling problem, providing a quick benchmarking tool.

18 Claims, 5 Drawing Sheets
(4 of 5 Drawing Sheet(s) Filed in Color)

DIGITAL IMAGE PROCESSOR SPOT COLOR WORKFLOW TEST FILE

BACKGROUND

The exemplary embodiments generally relate to digital imaging systems, and specifically relate to spot colors.

Graphic designers use different applications and different approaches to create color gradient blends. Few digital processor vendors properly handle blended spot color gradients. As a result, much customer support time—usually high level as lower level support staff often lack the tools and skills—is spent analyzing customer files and testing digital processors in attempts to sort out and isolate the source of blended gradients printing problems.

SUMMARY

Exemplary embodiments include an electronic portable document format (PDF) file that includes different combinations of gradient blends between spot color and process color. Each gradient blend is represented as both rasterized bitmap and vector images. The rasterized bitmap and vector images can be used to quickly assess the capability of any digital front end (DFE) to process the color gradient blends. The PDF file contains two sets of spot color and process color blended combinations. The first set contains four types of color gradient blends: spot-to-spot, process-to-spot, spot-to-process, and process-to-process, each of which represent the intended design. The second set contains the same four types of color gradient blends, except here the CMYK colors associated with the spot colors are intentionally manipulated. By printing the PDF file using different DFEs, one may compare the output from the two sets and immediately identify any color gradient handling problem, providing a quick benchmarking tool.

One aspect is a method for testing color features. A file is prepared to include at least a first element and a second element both having a particular color feature. The first element incorporates a named color in a dictionary associated with an application. The second element incorporates the same named color but with at least one color value redefined in the dictionary. After the file is printed from the application, it is determined whether the particular color feature was correctly processed by a digital image processor by comparing the first and second elements in the printed file. The particular color feature may be a color gradient blend, such as a spot-to-spot color gradient blend, a spot-to-process color gradient blend, a process-to-spot color gradient blend, or a process-to-process color gradient blend. The named color may be a spot color, such as a Pantone color. The file may also include two additional elements both having a process-to-spot, spot-to-process, or process-to-process color gradient blend so that it may be determined whether the gradient blend was correctly processed by the digital image processor by comparing them in the printed file. Another aspect is a computer-readable medium for storing instructions for performing this method for testing color features.

Yet another aspect is a xerographic system, including a computer system coupled to a printing system, which includes a digital image processor. The computer system executes an application to display a file. The file is prepared to include at least a first element and a second element both having a particular color feature. The first element incorporates a named color in a dictionary associated with the application and the second element incorporates the named color with at least one redefined color value in the dictionary. The printing system prints the file, after receiving a print request from the application. It is determined whether the particular color feature was correctly processed by the digital image processor by comparing the first and second elements in the printed file. The particular color feature that the first and second elements both have may be a spot-to-spot color gradient blend, a process-to-spot color gradient blend, or a spot-to-process color gradient blend.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

DETAILED DESCRIPTION OF EMBODIMENTS

Figure 1:
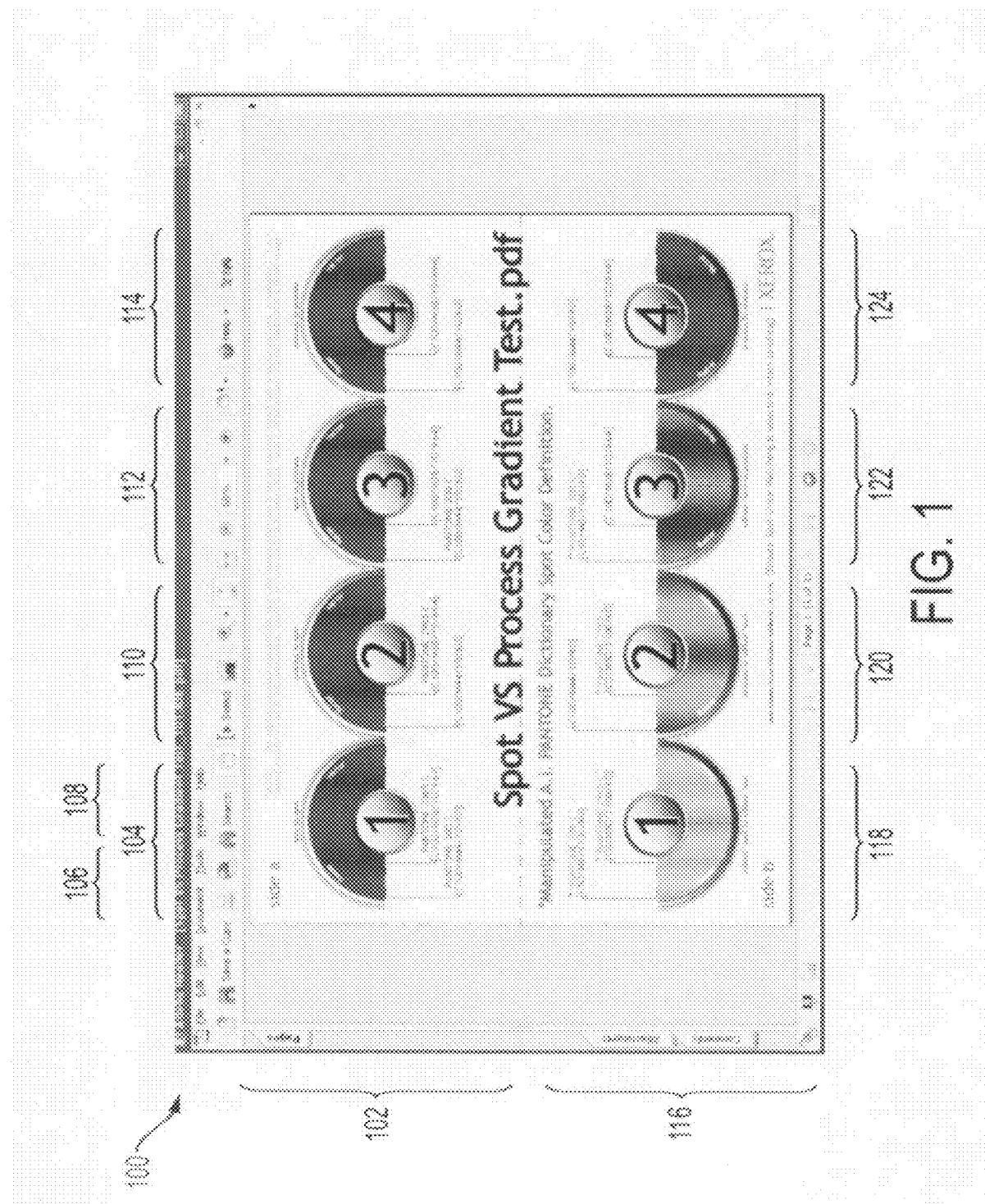
FIG. 1 illustrates an exemplary embodiment of a portable document format (PDF) file opened in Adobe Reader that includes two sets of spot color and process color blended combinations for testing the spot color handling capability of a digital color image processor.

Exemplary embodiments include a file that includes at least one set of spot color and/or process color blended combinations for determining the spot color handling capability of a given color image processor. Color image processors may be any xerographic machine, (e.g., a multifunctional printing product) or image display device.

A spot color is any color generated by an ink (pure or mixed) that is printed using a single run. The printing process is composed of four spot colors, namely cyan, magenta, yellow, and key (black), commonly referred to as CMYK. More advanced printing processes involve the use of six spot colors (hexachromatic process), which add orange and green to the process, referred to as CMYKOG. However, offset technicians around the world use the term spot color to mean any color generated by a non-standard offset ink, such as metallic, fluorescent, spot varnish, or custom hand-mixed inks.

There are various methods to incorporate rather sophisticated patterns of spot colors in a final prepress artwork. Software applications, such as Adobe InDesign, Adobe Illustrator, Adobe Photoshop, Microsoft Publisher, Microsoft PowerPoint, QuarkXPress, Scribus, among others may generate spot colors as additional channels or may create graphic elements including spot colors. Features of such applications may be used to generate soft edges (i.e., feathered edges), a dissolve effect, and other effects for spot colors. A gradient tool in such an application provides a gradual blend of color that can be considered as an even gradation from low to high values so that the image fades from one color to another color.

Pantone, Inc., a corporation in Carlstadt, N.J., provides a color specifying system, which is a proprietary color space. The Pantone system includes names for spot colors. There are also dictionaries of spot colors that are standardized for a color measurement system, such as the Commission Internationale d'Eclairage (CIE) 1976 L*, a*, b* (CIELAB) color space. The Pantone system allows users to color match specific colors. This Pantone system has been widely adopted by graphic designers, reproduction and printing houses for a number of years now. The Pantone color matching system works within existing color systems, such as the CMYK system. The Pantone system allows users to mix percentages of base inks, such as CMYK to create new colors physically (these are called spot colors). Pantone colors are described by a number, e.g., Pantone 2965C (blue).

A process color is a common shortened form of the phrase "four-color printing process." Process color refers both to a method of reproducing colored images and to the specific printed colors. Process color is also known as four color, CMYK, full process, and full color. In contrast spot color printing, specific colored inks are used to produce the colors appearing on paper, while four color printing relies on a graphic reproduction technique called halftoning, which converts an image into a halftone image, a mosaic of tiny solid dots. Full color printing relies on qualities of color mixing and human color perception and it is capable of reproducing a full range of color.

For example, when a graphic designer calls out and makes up colors for a design, the graphic designer may use a matching system, such as the Pantone system. A unique blend of spot colors may be created, for example, by taking one or more spot colors and blending them in a gradient in a design. When the design is to be printed, a file of code is generated for printing, such as a PostScript file. Not all color image processors (e.g., a digital front end (DFE) of a printing system, such as a multifunctional printing product) are able to correctly process such code. Furthermore, when a user changes a dictionary definition of a spot color, the color image processor will not be able to print the color the way that the user expects it to be printed, for example, the way the user sees the color in a design edited in an application and displayed on a computer monitor. When a user creates or modifies a color using an application, the application uses a color matching system and/or a dictionary to determine the color values for the user-created or user-modified color. These color values may be CMYK values, a color matrix, or color space values. If the user or application accidentally changes the dictionary definition of a named color, such as a spot color or Pantone color, so that the color values associated with the spot color in the dictionary are changed, then that color may not print as expected, depending on how it is processed by the digital front end.

If the digital front end converts the spot color to a process color by using the color values of the user-created or user-modified color in the PostScript file, then the output printed image will probably be what the user expected, even if the user had changed the definition of the spot color. This is because the dictionary correlates spot color names with process color values for the print engine to use to create the output.

If the digital front end uses the spot color by finding the entry for that spot color named in the PostScript file in a dictionary and uses the corresponding process color values, then the output printed image will probably not be what the user expected, if the user had changed the definition of the spot color. In effect, the user is lying to the printing system in this case by saying in the PostScript file to print the spot color, when the user really wanted a new color and should have saved the new color values to a new name.

Therefore, exemplary embodiments include test patterns that deliberately lie to a given printing system so that the printing system will get caught in the act so to speak. In other words, these test patterns determine whether the given printing system is honoring spot color according to the dictionary definition or whether the printing system is changing the colors to a process color. Once this is determined, the user will know why a color did not print as expected and know what to do to get the expected color printing results.

FIG. 1 illustrates an exemplary embodiment of a portable document format (PDF) file 100 opened in Adobe Reader that includes two sets of spot color and process color blended combinations for testing the spot color handling capability of a digital color image processor. This exemplary embodiment includes a single page PDF file that includes two sets of spot color and process color blended combinations. Other embodiments may have a different number of sets or combinations and may include various graphic features other than or in addition to blending. Other embodiments may have a varied appearance, such as different shapes, order, composition, instructions, textual matter and so on.

The first set 102 (on side a, which is located on the top half, above the dotted horizontal line in the middle of the page in FIG. 1) uses the default Pantone spot color names as found in the Adobe Illustrator CS2 application and the other set 116 (on side b, which is located on the bottom half, below the dotted horizontal line in the middle of the page in FIG. 1) uses CMYK values for those same Pantone spot colors that have been manipulated in the spot color dictionary table in the Adobe Illustrator CS2 application. Other embodiments may be generated for various other graphics applications and other spot color features. By processing the PDF file, the spot color handling capability of a particular digital color image processor can be determined by comparing the results of the two sets. Pantone spot colors are standard with most digital color image processors, but any named color set may be used in other embodiments.

The first set 102 (side a) includes four color blended elements. Each color blended element has a left sector and a right sector. The left sector of each element is a rasterized (i.e., bitmap) image, while the right sector is a vector image. For example, element one 104 of the first set 102 has rasterized image 106 and vector image 108. There are left and right sector blends for each of the four color blended elements: (1) spot-to-spot 104; (2) process-to-spot 110; (3) spot-to-process 112; and (4) process-to-process 114. The first set 102 represents the intended design of the user and all of the sectors are printed as blends of medium blue to dark blue (shown in FIG. 1 as grayscale).

The second set 116 (side b) includes three color blended elements 118, 120, 122 that include spot colors that retain the Pantone color names but have had their CMYK colors intentionally manipulated in the Adobe Illustrator Pantone Dictionary. Other embodiments may be created with various other applications and with various other named colors, color matching systems, and dictionaries. When side b vector set spot colors are not printed as a blend of the medium blue to dark blue, a conversion to process color has occurred, indicating that the spot colors in those blends are not being honored. The side b raster (bitmap) image should always reflect the conversion to process, as spot color information is lost in the conversion to a raster image. Element four 124 in the second set 116 (side b) is identical to element four 114 in the first set 102 (side a) and these two elements should always print alike. In one embodiment, these two elements 114, 124 are omitted; they are included in FIG. 1 for completeness.

By printing the file 100 through the digital color workflow, the capability of the processor to process spot color blends may be determined. Exemplary embodiments allow quick and easy assessment of digital processor capability by product program engineers, enabling feedback to digital front end developers or vendors earlier in the product development phase. In addition, exemplary embodiments enable initial levels of customer support to assess existing digital front end capability, reducing the time spent resolving customer problems. Furthermore, exemplary embodiments may be used in marketing, like Kodak test strips, to illustrate the color handling capabilities of printing systems.

The exemplary embodiment of FIG. 1 allows a tester to provide customer service by validating how a digital front end processes spot-to-spot, process-to-spot, spot-to-process, and process-to-process blends. The tester can open the test file 100 in a reader and print it or import the file 100 directly into the digital front end's workflow to evaluate the resulting print sample. The tester looks at the resulting print sample and by determining whether the side a images match the side b images, the tester can determine whether the printing system properly processes spot-to-spot, process-to-spot, spot-to-process, and process-to-process blends.

Figure 2:
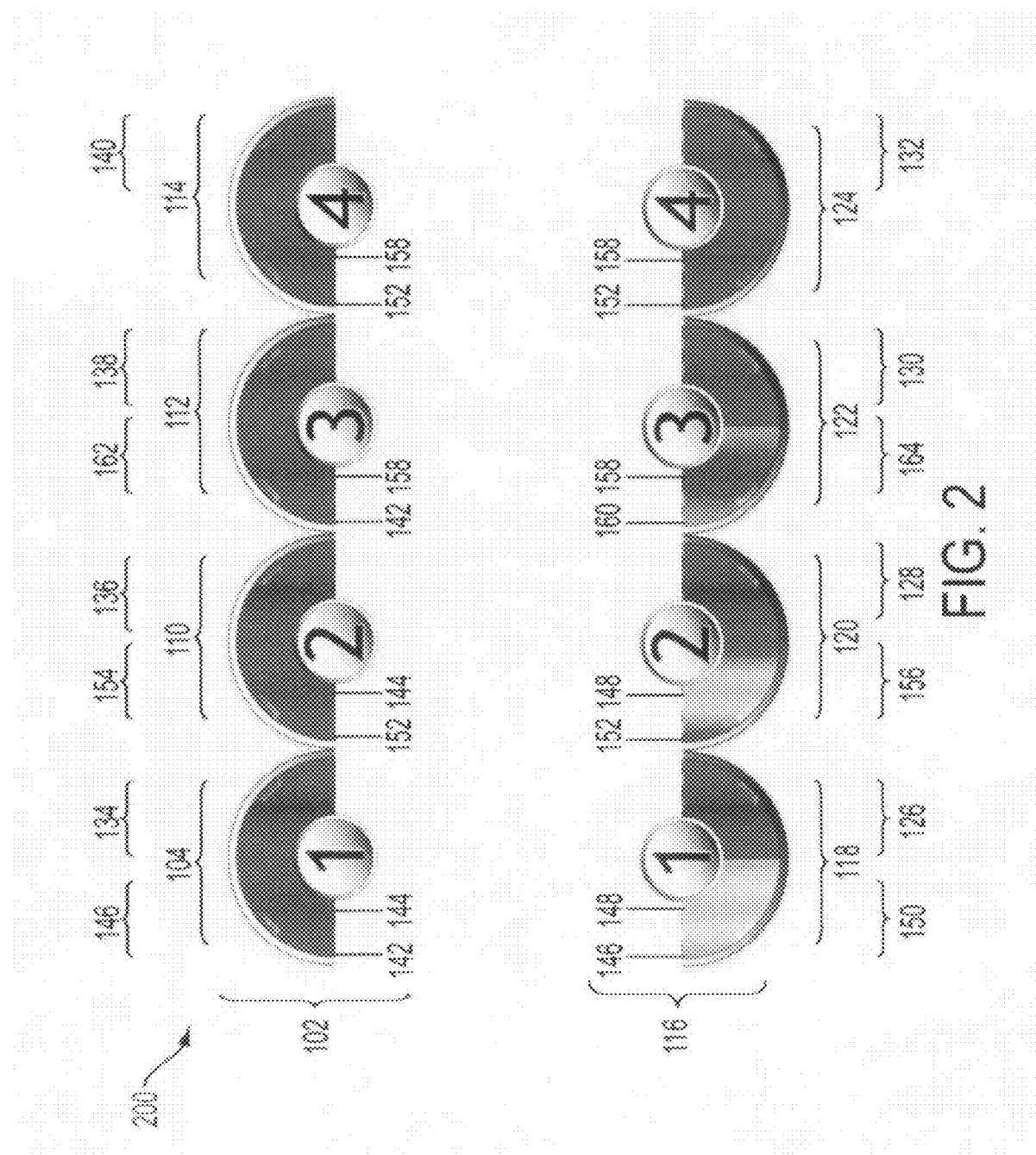
FIG. 2 illustrates a first case of the test file of FIG. 1 showing spot color recognition for all blended gradient vectors.

FIG. 2 illustrates a first case 200 of the printing the test file of FIG. 1, which shows spot color recognition for all blended gradient vectors. This is an example of an ideal customer satisfaction case. In this example, side b vector blended gradients (i.e., the right sectors 126, 128, 130, 132 of the elements 118, 120, 122, 124 respectively) match the side a vector blended gradients (i.e., the right sectors 134, 136, 138, 140 of the elements 104, 110, 112, 114). Thus, the printing system recognizes the spot colors in all four of the blended gradient vector image combinations.

In FIG. 2, there are four combinations: (1) a spot-to-spot combination; (2) a process-to-spot combination; (3) a spot-to-process combination; and (4) a process-to-process combination. The spot-to-spot (1) combination includes element one 104 of the first set 102 (side a) and element one 118 of the second set 116 (side b). The process-to-spot (2) combination includes element two 110 of the first set 102 (side a) and element two 120 of the second set 116 (side b). The spot-to-process (3) combination includes element three 112 of the first set 102 (side a) and element three 122 of the second set 116 (side b). The process-to-process (4) combination includes element four 114 of the first set 102 (side a) and element four 124 of the second set 116 (side b). Thus, each combination has one element in the first set 102 and another element in the second set 116. The first set 102 (side a) are the intended user design and the second set 116 (side b) are the manipulated Adobe Illustrator dictionary spot color definitions, i.e., the color values for named spot colors have been changed in the dictionary.

In the spot-to-spot (1) combination 104, 118, a first spot color 142 is blended with a second spot color 144 in both the left 146 (raster) and right 134 (vector) sectors. In this example, the first spot color 142 is Pantone 300C, which has the color values C=100, M=44, Y=0 and K=0, and the second spot color 144 is Pantone 2965C, which has the color values C=100, M=38, Y=0 and K=64. Element one 104 of the first set 102 (side a) prints as matching or simulating the spot color blend. By contrast, whether element one 118 of the second set 116 (side b) prints correctly, depends on the printing system, because elements in the second set 116 (side b) have manipulated Adobe Illustrator dictionary spot color definitions.

On side b of the spot-to-spot (1) combination 118, the first spot color 146 is still named Pantone 300C (like first spot color 142 in side a), but now has the color values are C=50, M=0, Y=100 and K=0 and the second spot color 148 is still named Pantone 2965C (like second spot color 144 in side a), but now has the color values C=0, M=50, Y=100 and K=0. When this spot-to-spot combination is printed, if the printing system does not honor spot color definitions but instead converts spot-to-process, then in the resulting printed image, element one 104 in the first set 102 (side a) will not match element one 118 in the second set 116 (side b). In the case shown in FIG. 2, the vector sectors 134, 126 of the spot-to-spot combination match each other.

In this example, the side b color values were manipulated to be a striking contrast to the side a color values. As can be seen in the raster sectors 146, 150 of the spot-to-spot (1) combination, the color went from blue to green and orange and from blue black to green and orange, which are shown in grayscale in FIG. 2. Other embodiments may manipulate the color values for side b differently so long as the color values for side b are recognizably different from the spot colors of side a to the viewer. If the resulting printed spot-to-spot (1) combination is different on side a and side b, then it is likely that a graphic designer who accidentally re-defined the color values for a spot color while keeping the same spot color name will get a printout with unexpected colors. In this case, the graphic designer could remedy the problem by restoring the spot color to the standard values and naming his unique color with a new name.

In the process-to-spot (2) combination 110, 120, a process color 152 blends to a spot color 144. In this example, the process color 152 has the color values C=100, M=44, Y=0 and K=0 and the spot color 144 is Pantone 2965C, which has the color values C=100, M=38, Y=0 and K=64. Element two 110 of the first set 102 (side a) will print as matching or simulating the process-to-spot color blend. By contrast, whether element two 120 of the second set 116 (side b) prints correctly, depends on the printing system. In this example, element two 120 of the second set 116 (side b) has manipulated Adobe Illustrator dictionary spot color definitions, yet the vector sector 136 on side a matches the vector sector 128 on side b for the process-to-spot combination 110, 120.

On side b of the process-to-spot (2) combination 120, the process color 152 still has the same color values and the spot color 148 is still named Pantone 2965C (like second spot color 144 in side a), but now has the color values C=0, M=50, Y=100 and K=0. As can be seen in the raster sectors 154, 156 of the process-to-spot (2) combination 110, 120, the process color 152 stayed the same while the spot color 144, 148 went from blue black 144 to green and orange 148, which are shown in grayscale in FIG. 2.

In the spot-to-process (3) combination 112, 122, spot color 142 blends to process color 158. In this example, the spot color 142 is Pantone 300C, which has the color values C=100, M=44, Y=0 and K=0 and the process color 158 has the color values C=100, M=38, Y=0 and K=64. Element three 112 of the first set 102 (side a) will print as matching or simulating the spot-to-process color blend. By contrast, whether element three 122 of the second set 116 (side b) prints correctly, depends on the printing system. In this example, element three 122 of the second set 116 (side b) has manipulated Adobe Illustrator dictionary spot color definitions, yet the vector sector 138 on side a matches the vector sector 130 on side b for the spot-to-process combination 112, 122.

On side b of the spot-to-process (3) combination 122, the process color 158 still has the same color values and the spot color 160 is still named Pantone 300C (like spot color 142 in side a), but now has the color values C=50, M=0, Y=100 and K=0. As can be seen in the raster sectors 162, 164 of the process-to-spot (3) combination 112, 122, the process color 158 stayed the same while the spot color 142, 160 went from blue 142 to green and blue 160, which are shown in grayscale in FIG. 2.

In the process-to-process (4) combination, a first process color 152 blends to a second process color 158. In this example, the first process color 152 has the color values C=100, M=44, Y=0 and K=0 and the second process color 158 has the color values C=100, M=38, Y=0 and K=64. Element four 114 of both sets 102, 116 (sides a and b) will print as matching or simulating the process-to-process color blend.

Figure 3:
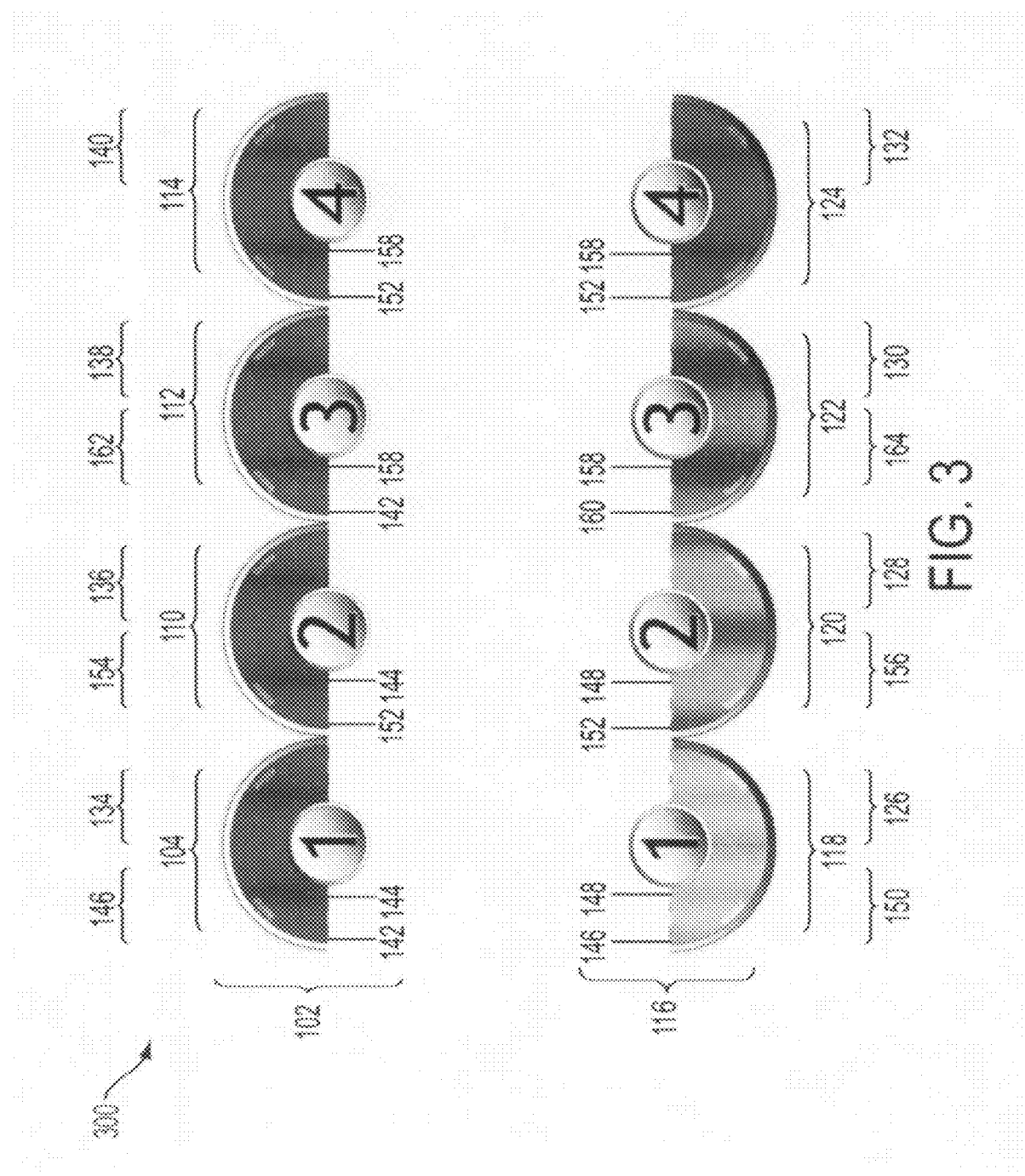
FIG. 3 illustrates a second case of the test file of FIG. 1 showing no spot color blends recognized.

FIG. 3 illustrates a second case 300 of the test file of FIG. 1 showing no spot color blends recognized. This is an example of a less than an ideal customer satisfaction case. In this example, side b vectors blended gradients (i.e., the right sectors 126, 128, 130, 132 of the elements 118, 120, 122, 124 in the second set 116) only match the side a vector blended gradients for element four (i.e., the right sector 140 of element four 114 in the first set 102), process-to-process blended gradient colors. Thus, the printing system was unable to recognize the spot colors in any of the blended gradient vector image combinations.

Figure 4:
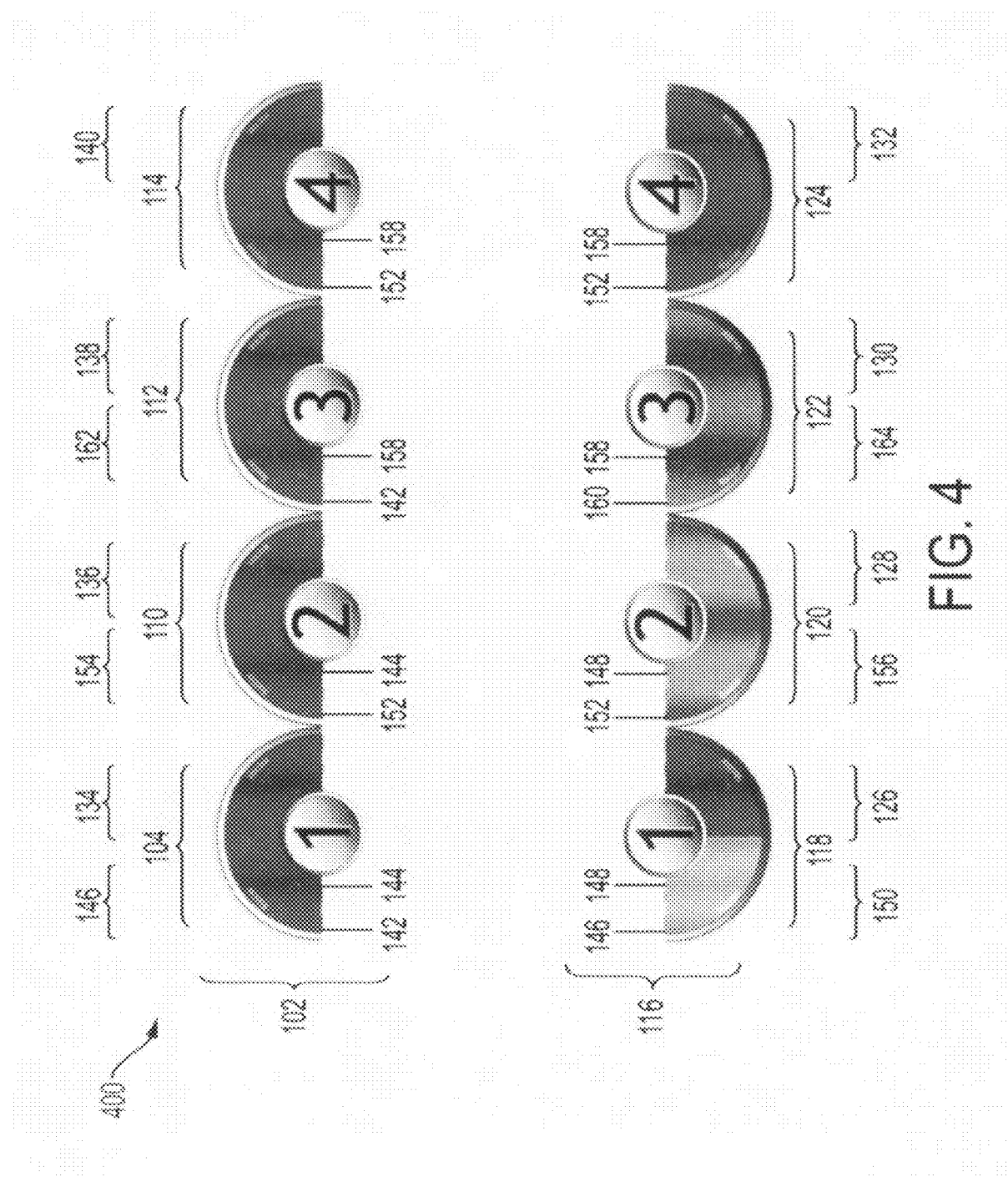
FIG. 4 illustrates a third case of the test file of FIG. 1 showing spot-to-spot blended gradient vectors recognized.

FIG. 4 illustrates a third case 400 of the test file of FIG. 1 showing spot-to-spot blended gradient vectors recognized. This is an example of a marginal customer satisfaction case. In this example, side b vector blended gradients (i.e., the right sectors 126, 128, 130, 132 of the elements 118, 120, 122, 124 in the second set 116) match with only two of the side a vectors, element one 104, spot-to-spot vector blended gradient, (i.e., the right sector 134 of element one 104 in the first set 102) and element four 114, process-to-process blended gradient (i.e., the right sector 140 of element four 114 in the first set 102). Thus, the printing system was unable to recognize the spot colors in elements two and three, the spot-to-process and process-to-spot blended gradient vector image combinations (i.e., the first 102 and second sets 116 of the right sector 128, 136 of element two 110, 114 and the first 102 and second sets 116 of the right sector 130, 138 of element three 112, 122).

Figure 5:
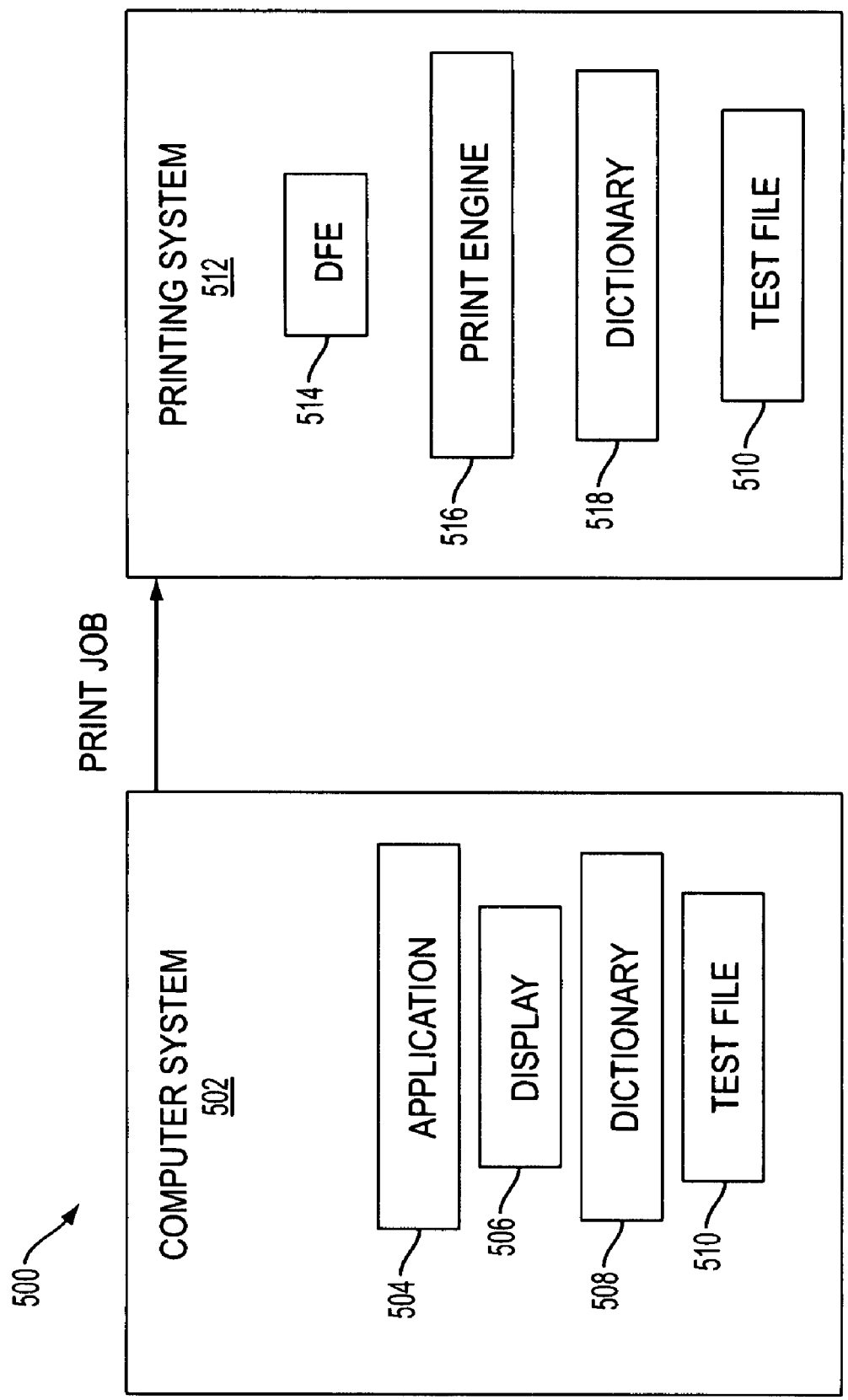
FIG. 5 illustrates a block diagram of an exemplary system for using the test file of FIG. 1.

FIG. 5 illustrates a block diagram of an exemplary system for using the test file of FIG. 1. A computer system 502 includes an application 504, such as Adobe Illustrator, that allows a user to edit and display graphical designs on a display 506. The application 504 uses a dictionary 508 for named color definitions. A test file 510, such as the file 100 of FIG. 1 may be printed from the application to test the capabilities of a printing system 512. The printing system 512 processes the test file 510 using a digital front end 514, a print engine 516, and a dictionary 518, which is different than the application dictionary 508. The print engine 516 re-creates spot colors by simulation or calibration to match the spot color with a set of color values in the printing system dictionary 518. On the application side, the designer may select a spot color from the application dictionary 508 for a graphical design. The application dictionary 508 may define a given spot color with a different set of color values (e.g., for display) than the printing system dictionary 518, but both are matching the spot color. To the extent that the defined color values in the application dictionary 508 match the defined color values in the printing system dictionary 518, then an output image may be what the user expects, regardless of whether the digital front end 514 honors the spot color or converts from spot to process before printing. However, when a user has redefined the color values for a spot color so they no longer match the defined color values in the printing system dictionary 518, the output image may not be what the user expects when the digital front end 514 honors the spot color name.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for testing color features, comprising:
    preparing a file to include at least a first element and a second element both having a particular color feature, the first element incorporating a named color, formed by combining a plurality of base colors in accordance with a recipe located in a dictionary associated with an application, the second element incorporating the named color with at least one redefined color value in the dictionary;
    printing the file from the application; and
    determining whether the particular color feature was correctly processed by a digital image processor by comparing the first element with the second element in the printed file,
    wherein the particular color feature is a color gradient blend, and the first and second elements are displayed side-by-side as semi-circular outputs.

2. The method of claim 1, wherein the named color is a spot color.

3. The method of claim 1, wherein the particular color feature that the first and second elements both have is a spot-to-spot color gradient blend.

4. The method of claim 2, wherein the file further includes a third element and a fourth element both having a process-to-process color gradient blend, the method further comprising:
    determining whether the process-to-process color gradient blend was correctly processed by the digital image processor by comparing the third element with the fourth element in the printed file.

5. The method of claim 2, wherein the named color is a Pantone color.

6. The method of claim 2, wherein the file further includes a third element and a fourth element both having a process-to-spot color gradient blend, the method further comprising:
    determining whether the process-to-spot color gradient blend was correctly processed by the digital image processor by comparing the third element with the fourth element in the printed file.

7. The method of claim 2, wherein the file further includes a third element and a fourth element both having a spot-to-process color gradient blend, the method further comprising:
    determining whether the spot-to-process color gradient blend was correctly processed by the digital image processor by comparing the third element with the fourth element in the printed file.

8. A computer-readable medium for storing instructions for performing a method for testing color features, the method comprising:
    preparing a file to include at least a first element and a second element both having a particular color feature, the first element incorporating a named color, formed by combining a plurality of base colors in accordance with a recipe located in a dictionary associated with an application, the second element incorporating the named color with at least one redefined color value in the dictionary;

printing the file from the application; and determining whether the particular color feature was correctly processed by a digital image processor by comparing the first element with the second element in the printed file, wherein the particular color feature is a color gradient blend, and the first and second elements are displayed side-by-side as semi-circular outputs.

9. The computer-readable medium of claim 8, wherein the particular color feature that the first and second elements both have is a spot-to-spot color gradient blend.

10. The computer-readable medium of claim 9, wherein the file further includes a third element and a fourth element both having a process-to-process color gradient blend, the method for testing color features further comprising:

determining whether the process-to-process color gradient blend was correctly processed by the digital image processor by comparing the third element with the fourth element in the printed file.

11. The computer-readable medium of claim 9, wherein the file further includes a third element and a fourth element both having a process-to-spot color gradient blend, the method for testing color features further comprising:

determining whether the process-to-spot color gradient blend was correctly processed by the digital image processor by comparing the third element with the fourth element in the printed file.

12. The computer-readable medium of claim 9, wherein the file further includes a third element and a fourth element both having a spot-to-process color gradient blend, the method for testing color features further comprising:

determining whether the spot-to-process color gradient blend was correctly processed by the digital image processor by comparing the third element with the fourth element in the printed file.

13. The computer-readable medium of claim 9, wherein the named color is a Pantone color.

14. The computer-readable medium of claim 8, wherein the named color is a spot color.

15. A xerographic system, comprising:

a computer system capable of executing an application to display a file, the file prepared to include at least a first element and a second element both having a particular color feature, the first element incorporating a named color, formed by combining a plurality of base colors in accordance with a recipe located in a dictionary associated with the application, the second element incorporating the named color with at least one redefined color value in the dictionary; and a printing system for printing the file, after receiving a print request from the application, the printing system coupled to the computer system, the printing system including a digital image processor;

wherein whether the particular color feature was correctly processed by the digital image processor is determined by comparing the first element with the second element in the printed file, and the particular color feature is a color gradient blend, and the first and second elements are displayed side-by-side as semi-circular outputs.

16. The xerographic system of claim 15, wherein the file further includes a third element and a fourth element both having a process-to-spot color gradient blend, the system further comprising:

determining whether the process-to-spot color gradient blend was correctly processed by the digital image processor by comparing the third element with the fourth element in the printed file.

17. The xerographic system of claim 15, wherein the file further includes a third element and a fourth element both having a spot-to-process color gradient blend, the system further comprising:

determining whether the spot-to-process color gradient blend was correctly processed by the digital image processor by comparing the third element with the fourth element in the printed file.

18. The xerographic system of claim 15, wherein the particular color feature that the first and second elements both have is a spot-to-spot color gradient blend.

* * * * *